W. J. LANOUETTE.
SELF REGISTERING CALIPERS.
APPLICATION FILED FEB. 17, 1915.

1,168,515.

Patented Jan. 18, 1916.

Witnesses
H. B. Hoffman
Dudley B. Howard

Inventor
W. J. Lanouette
By Victor J. Evans
Attorney

UNITED STATES PATENT OFFICE.

WILLIAM J. LANOUETTE, OF ROXBURY, VERMONT.

SELF-REGISTERING CALIPERS.

1,168,515.   Specification of Letters Patent.   Patented Jan. 18, 1916.

Application filed February 17, 1915. Serial No. 8,901.

*To all whom it may concern:*

Be it known that I, WILLIAM J. LANOUETTE, a citizen of the United States, residing at Roxbury, in the county of Washington and State of Vermont, have invented new and useful Improvements in Self-Registering Calipers, of which the following is a specification.

This invention relates to calipers, and has for its primary object to provide a combined inside and outside caliper, both caliper devices being mounted within a casing wherein means is provided for registering the exact adjustment of the active points of either caliper when the same have been operatively engaged with the internal or external surface whose diameter is to be measured. This device is complete in itself and may be used without the necessity of employing a rule or other device for gaging distance between the active points of either caliper.

A further object of the invention is to provide a device of this character which is simple in construction so as to be inexpensive in the cost of manufacture, durable, and readily operable.

Figure 1:
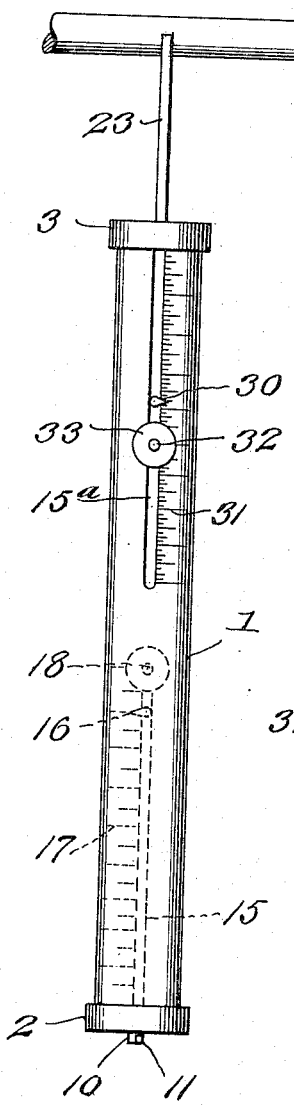
Figure 2:
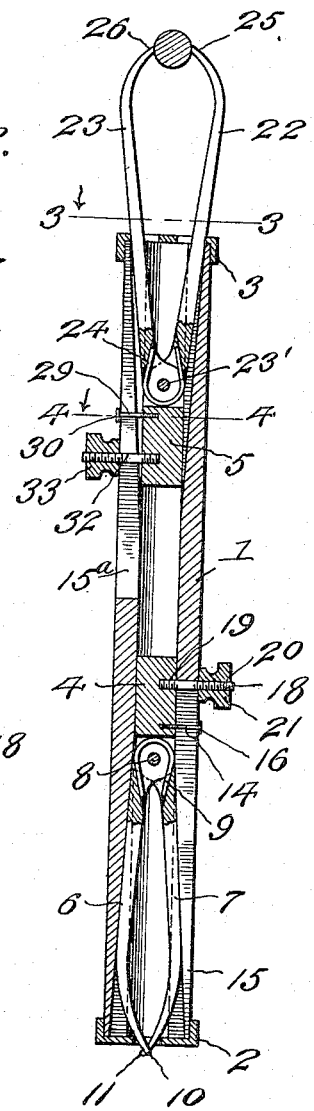
Figure 3:
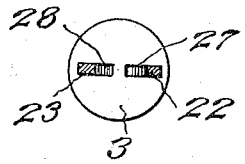
Figure 4:
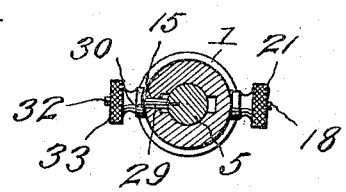
Figure 5:
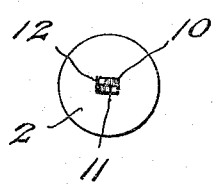

The invention consists in the features of construction, combination, and arrangement of parts, hereinafter fully described and claimed, reference being had to the accompanying drawing, in which:

Figure 1 is a side elevation of the device, the outside caliper being shown in use; Fig. 2 is a longitudinal sectional view taken through the same; Fig. 3 is a transverse sectional view on line 3—3 of Fig. 2; Fig. 4 is a transverse sectional view on line 4—4 of Fig. 2; and, Fig. 5 is a bottom plan view of the device.

In the drawing, the numeral 1 designates the body or casing of the device which is in the form of a hollow cylinder having its ends closed by means of the removable caps 2 and 3. Two independently movable slide blocks 4 and 5 of cylindrical construction are mounted for longitudinal sliding movement within the said body. The bowed legs 6 and 7 of an inside caliper are pivotally connected to the outer end of the slide block 4, by means of the transverse pivot pin 8. A U-shaped leaf spring 9 is provided at this pivot point and has its terminals engaged with the caliper legs 6 and 7 so that it exerts outward pressure upon the same and tends to maintain the legs normally expanded. The free ends 10 and 11 of the said caliper legs are adapted to project outwardly through the opening 12, in the end cap 2, through which opening the caliper legs are longitudinally movable so that the free ends thereof may be engaged with the inner peripheries of tubes or bores of any description. It should therefore be apparent that it is necessary to move the caliper legs, and consequently the slide block 4 longitudinally with respect to the body 1 in order to adjust the free ends of the legs to the surface whose diameter is to be gaged. The degree of longitudinal movement of the slide block is thus directly proportional to the degree of radial movement of the leg extremities. In order that the degree of movement of the said slide block may be determined in each operation of the inside caliper, an indicator pin is secured to the slide block so as to project radially through a longitudinal slot 15 in the body. The outer end of this pin is projected laterally at 16 so as to provide a pointer which is adapted to traverse a linear scale 17 provided upon the outer face of the body 1 along one side edge of the slot. This scale is graduated in such a manner that it will indicate the true degree of expansion of the free ends of the caliper legs.

In order that the slide block 4 may be secured in its different longitudinally adjusted positions, a radial screw member 18 has its inner end threaded into a recess 19 provided in the slide block and is slidable within the slot 15. The outer end of this screw member is screw threaded as at 20 for the reception of a clamping nut 21, which latter is engageable with the outer face of the body 1 for the purpose of locking the slide block against movement.

The legs 22 and 23 of an outside caliper are pivotally connected at 23' to the outer end of the slide block 5 and are adapted to be maintained normally in expanded relation to each other by means of the leaf-spring 24 which is identical in construction to the previously described spring 9 and is engaged in like manner with the legs of the outside caliper. The free ends 25 and 26 of the caliper legs 22 and 23 respectively, are movable through diametrically opposite openings 27 and 28 provided in the end cap 3 and may be engaged with the outer periphery of a cylindrical body or the like in order to determine the external diameter of the same. This gaging is to be determined in like manner by obtaining the degree of corresponding longitudinal movement of the slide block 5, when the caliper legs are expanded. The means employed for determining such movement of the slide block is in the form of a radial indicator pin 29 identical in construction to the pin 14, and which is mounted upon the slide block 5 so as to be longitudinally movable through the body slot 15ª. The lateral pointer 30 provided upon this indicator pin is adapted for use in conjunction with a linear scale 31 provided upon the outer surface of the said body, as should be readily understood.

A screw member 32 is detachably engaged with the slide block 5 and is slidable within the slot 15ª, a clamping nut 33 being threaded onto the outer end of the said screw member for engagement with the outer surface of the body 1, whereby the slide block may be secured in its different longitudinally adjusted positions.

From the foregoing description taken in connection with the accompanying drawing, it should be apparent that I have provided a simply constructed and efficient inside and outside caliper device which is very compact and may be used handily and accurately in various capacities. I desire to have it understood, however, that I may resort to minor changes falling within the scope of the appended claims, if found necessary in practice.

Having thus described my invention, what I claim is:

1. A measuring instrument of the class described comprising an elongated hollow body, a closure cap provided upon one end of said body and having guide openings therein, a slide block mounted for longitudinal movement within the body, a caliper including expansible legs pivoted to said slide block and having their free ends movable through the said guide openings and adapted to project outwardly from the body, and means by which the longitudinal movement of the slide block may be determined.

2. A measuring instrument of the class described comprising an elongated hollow body, a closure cap provided upon one end of said body and having guide openings therein, a slide block mounted for longitudinal movement within the body, a caliper including expansible legs pivoted to said slide block and having their free ends movable through the said guide openings and adapted to project outwardly from the body, means by which the longitudinal movement of the slide block may be determined, and yieldable means for normally maintaining the caliper legs in expanded relation to each other.

3. A measuring instrument of the class described comprising an elongated hollow body, a closure cap provided upon one end of said body and having guide openings therein, a slide block mounted for longitudinal movement within the body, a caliper including expansible legs pivoted to said slide block and having their free ends movable through the said guide openings and adapted to project outwardly from the body, means by which the slide block may be se- of the slide block may be determined, and means by which the slide block may be secured in its different adjusted positions.

In testimony whereof I affix my signature in presence of two witnesses.

WILLIAM J. LANOUETTE.

Witnesses:
ZED S. STANTON,
JESSIE L. STANTON.

Copies of this patent may be obtained for five cents each, by addressing the "Commissioner of Patents, Washington, D. C."